Oct. 26, 1965  E. E. CHEEK  3,214,034
RAILROAD CAR DUMPER WEIGHT SENSING APPARATUS
Filed March 29, 1963  10 Sheets-Sheet 5

INVENTOR.
EDWARD E. CHEEK
BY
ATTORNEY.

Oct. 26, 1965  E. E. CHEEK  3,214,034
RAILROAD CAR DUMPER WEIGHT SENSING APPARATUS
Filed March 29, 1963  10 Sheets-Sheet 6

FIG. 7

INVENTOR.
EDWARD E. CHEEK
BY
ATTORNEY.

Oct. 26, 1965 E. E. CHEEK 3,214,034
RAILROAD CAR DUMPER WEIGHT SENSING APPARATUS
Filed March 29, 1963 10 Sheets-Sheet 9

Fig.11

INVENTOR.
EDWARD E. CHEEK
BY
ATTORNEY.

Oct. 26, 1965   E. E. CHEEK   3,214,034
RAILROAD CAR DUMPER WEIGHT SENSING APPARATUS
Filed March 29, 1963   10 Sheets-Sheet 10

Fig. 12

INVENTOR.
EDWARD E. CHEEK
BY
ATTORNEY.

United States Patent Office 3,214,034
Patented Oct. 26, 1965

3,214,034
RAILROAD CAR DUMPER WEIGHT
SENSING APPARATUS
Edward E. Cheek, Cleveland, Ohio, assignor, by mesne assignments, to McDowell-Wellman Engineering Company
Filed Mar. 29, 1963, Ser. No. 268,890
12 Claims. (Cl. 214—2)

This invention relates to an apparatus useful in weighing railroad cars before and after dumping to give a more accurate measure of the quantity dumped.

In bulk material loading systems employing rotary railroad car dumpers a reasonably accurate measure of the weight of material dumped is required. Heretofore certain car weighing devices have depended on weighing means disposed between the foundation and a conventional rotary car dumper. The weight measured in such an installation includes an entire lumping structure weighing as much as 150 tons plus a railroad car and its contents. Net weight after dumping in such cases is still over 150 tons. Hence the change in weight is a relatively small proportion of the tare weight which impairs accuracy. In still another device, the weighing means while weighing a smaller part of the entire apparatus is subjected to inversion and rerighting cycles along with the car dumper which impairs the reproducibility of readings by the apparatus.

It has now been found that more accurate results can be secured with less complicated, stationary weight sensing means thereby avoiding difficulties such as above-mentioned. Basically, it has been found that a bridge, or platen, may be freely mounted within a rotatable car dumper cradle, extending through it and rotatable therewith. Stationary weighing means are provided which are capable of supporting the bridge or platen independently of the car dumper in the normal upright position, i.e. zero rotation. Thus, only the weight of the platen or bridge and the car, with and without contents, is sensed in such devices, and both of the problems above mentioned are avoided with resultant greater accuracy and reproducibility.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

This invention will be better understood by having reference to the annexed drawing which are illustrative of a preferred embodiment and wherein.

Briefly stated, then, this invention is the provision in a rotary railroad car dumping apparatus having a rotatable car dumper cradle, of a railroad car track supporting platen or bridge freely extending through the cradle and mounted for rotation therewith, and weighing means for supporting only the platen or bridge and a railroad car or cars thereon, with and without bulk contents, independently of the car dumper cradle at normal upright position, or zero rotation.

Weight may be sensed by any conventional means including those as simple and conventional as a scaled beam and a weight movable therealong, and those as esoteric as the various strain gauges, signals from which are converted directly or indirectly into weight readings as pounds or tons. During the weight sensing operation which is performed with the rotary car dumper normally at zero rotation, the clamps which hold the car-platen combination firmly within the cradle during inverting and rerighting, are free of the car, and the platen-car combination is free of the cradle except for optional tie rods or stabilizers which limit motion of the platen in either one or both horizontal directions and exert no weight distorting vertical component of force.

The car inverting apparatus of this invention is primarily of conventional design as are the car-platen clamping means. The latter are usually adapted to firmly clamp the car to the tracks on the platen, and the platen in turn to the cradle, shortly after leaving the normal upright position. Release of the clamping means is effected just prior to return to zero rotation. Inversion of the cradle is also accomplished by conventional means, e.g. those shown in the drawing and including an arcuate rack and a driving pinion.

Notable departures from conventional structure and operation include the nature and extent of the platen or bridge and its disposition in the cradle, and the stationary weight sensing means will coact therewith to weigh only the car or cars and the platen independently of the cradle. In the main, other departures from convention are made necessary by those above enumerated.

Figure 1:
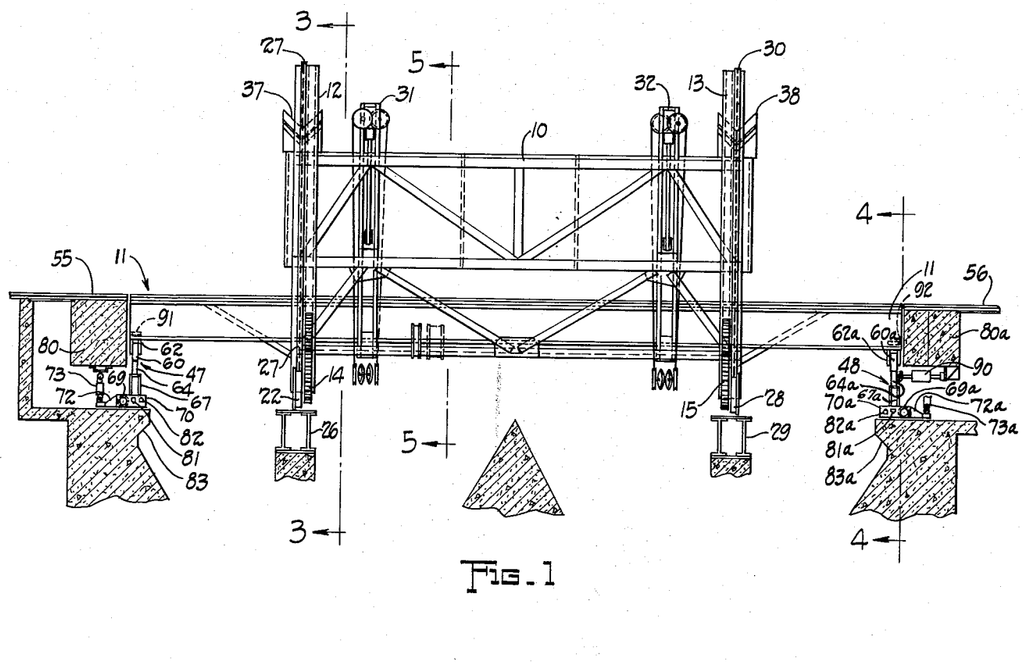
FIG. 1 is a side elevation of a rotary car dumper showing a bridge, or platen, freely extending through the cradle, and also showing weight sensing means carried by the foundation and adapted to support the weight of the platen and any load thereon such as a loaded or unloaded railroad car independently of the car-inverting cradle structure.
Figure 2:
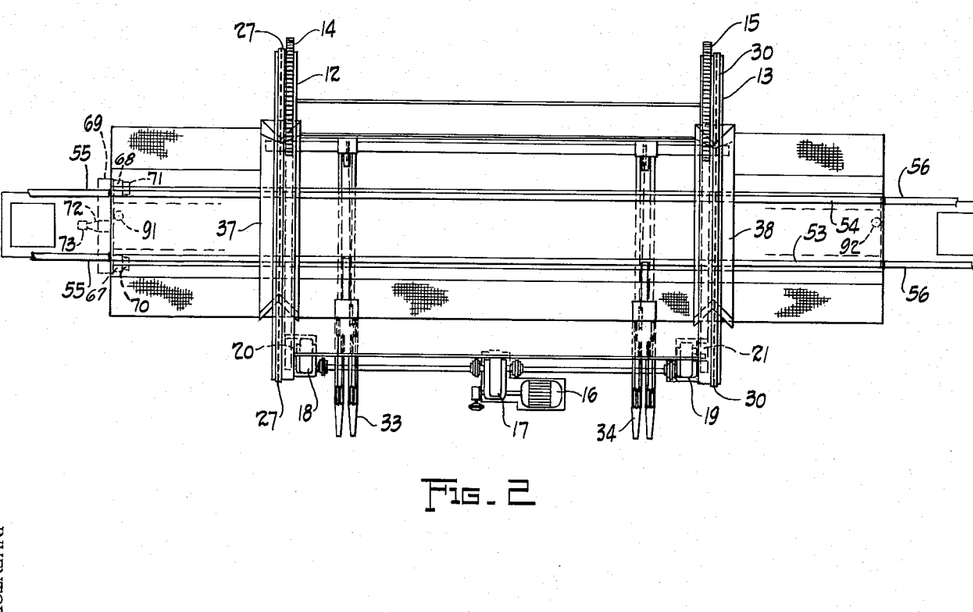
FIG. 2 is a top plan view of the apparatus shown in FIG. 1.
Figure 3:
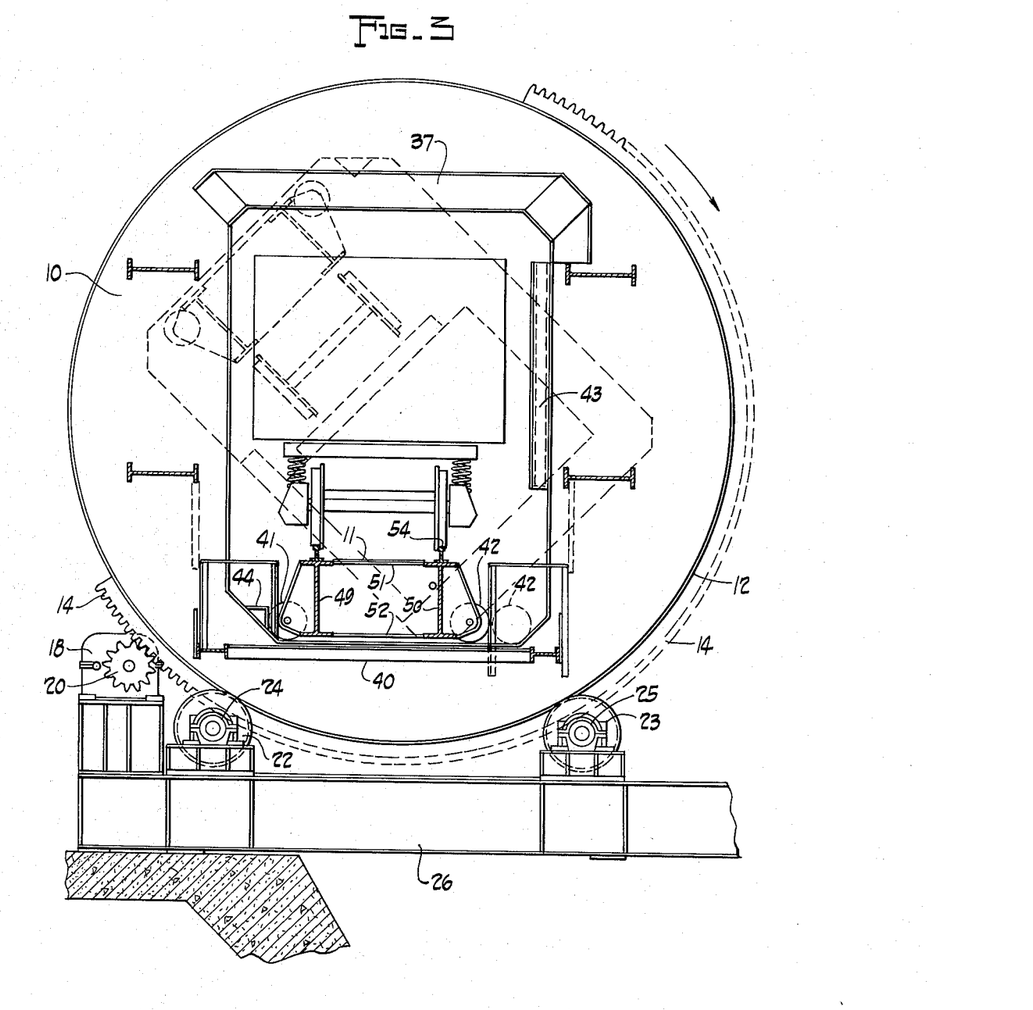
FIG. 3 is a cross-sectional view taken in the plane indicated by the line 3—3 in FIG. 1, and showing a cross-sectional view of the railroad car supporting bridge and its mode of disposition in the cradle, the extent of lateral movement of the platen being shown by the dotted wheel, and the position of the car in dumping position shown in dotted lines.

Referring more particularly to FIGS. 1 to 3, there is here shown an embodiment of this invention. Accordingly, there is provided a rotary railroad car dumping cradle 10 comprising suitable framework for receiving therein a railroad car track supporting platen or bridge 11 freely extending therethrough. Each extremity of cradle 10 is provided with end rings 12 and 13, each in turn having an arcuate rack 14 and 15 respectively, secured thereto. Means for effecting rotation of the cradle 10 may include, for example, motor 16 coacting through reducing means 17 and pinion reducers 18 and 19, respectively, to drive pinions 20 and 21.

Figures 4, 5:
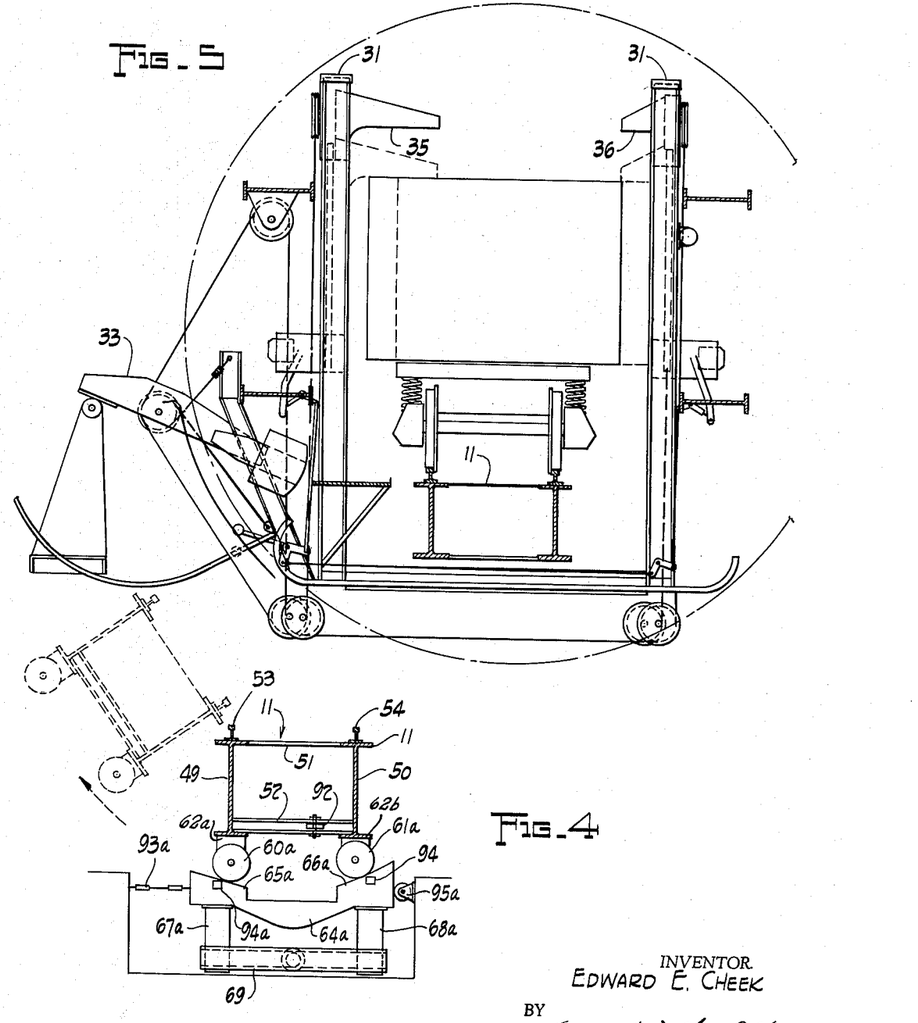
FIG. 4 is a cross-sectional view of the car dumping cradle taken in the plane indicated by the line 4—4 of FIG. 1, and showing in dotted lines the cradle moved away from the weight sensing means.
FIG. 5 is an end elevation taken in the plane indicated by the line 5—5 of FIG. 1 and showing platen supporting means and weight sensing means, and also showing in dotted lines the relative position of the clamps and car when clamping occurs.

Supporting and guiding flanged rollers 22 and 23 journalled for rotation in suitable pillow blocks 24 and 25 and carried by sill beam 26 coact with a rim 27 on end ring 12 to rotatably support and guide one end at cradle 10. Similar means including roller 28, and its opposite roller, not shown, are similarly mounted on sill beam 29 for coaction with rim 30 on end ring 13 are provided to support the other end of cradle 10. As indicated, front and rear clamps generally indicated at 31 and 32 are provided, and these may be of conventional structure. Clamp lifting arms 33 and 34 coact through suitable cables and sheaves to lift or lower rear hooks 35 and front hooks 36 on approaching or departing from zero rotation or normal upright position as shown in FIGS. 1 to 3, and 5. To protect end rings 12 and 13 from damage by cascading coal or ore, deflectors 37 and 38 may be provided. The direction of rotation of the cradle 10 as shown in FIGS. 3 and 5 is clockwise.

Cradle 10 is conveniently provided with transversely extending runways, such as runway 40 in the plane of each of the end rings 12 and 13, respectively. The runways 40 are normally horizontal, i.e. at zero rotation. As soon as positive rotation is initiated, i.e. clockwise toward dumping position, the cradle 11, which is mounted on suitable rollers 41 and 42 adapted to coact with the runways 40 at each end ring, moves laterally in response to gravitational forces to abutting relation with bumper 43. Maximum lateral travel is shown by the roller 42 in dotted lines. Freedom of some lateral movement is desirable in order that that weight affecting vertical components of force shall not be unnecessarily introduced into the system, and for purposes of accommodating a variety of gondola car wdiths. Stop 44 in end ring 12, and an equivalent member in end ring 13 (not shown) arrests lateral movement of platen 11 during negative rotation, i.e. return to normal upright position after dumping, or counterclockwise in FIG. 3. Check rod means operative in one horizontal direction normal to the axis of rotation may also be provided.

Platen 11 extends freely through cradle 10 and desirably extends beyond the extremities of cradle 10 at each end thereof. At zero rotation, platen 11 is supported independently of cradle 10. In the embodiment shown in FIGS. 1 to 5, inclusive, this suport is at the extremities of platen 11. Additional intermediate supports may be provided if desired. Terminal supports, generally indicated at 47 and 48, are preferred. The platen 11 may be of a length sufficient to carry two cars on a severed rotatable track section although in the usual installation, only one car is emptied at a time.

Platen 11 is generally of box-like construction formed from longitudinal I-beams 49 and 50 and top and bottom plates 51 and 52. Rails 53 and 54 are secured to platen 11 and severed from their respective continuations 55 and 56 at each end, respectively, which communicate with supply and run-off rails, respectively. The approach end is the left end as shown in FIGS. 1 and 2.

As best shown in FIG. 4, platen 11 is provided at each support point (i.e. its extremities in the embodiment of FIGS. 1 to 3), with a pair of rollers, e.g. rollers 61a and 60a journalled for rotation in suitable brackets 62b and 62a, respectively. Forward rollers 60 and 60a are the first to leave the supporting beams 64 and 64a, respectively, on positive rotation, and rear rollers 61 (not shown) and 61a are the first to contact beams 64 and 64a respectively, on negative rotation although only minutes of angular rotation separate contacting or departure of the rollers, respectively, on or from the beams 64 and 64a. The rollers, e.g. rollers 60a and 61a, are desirably set at different axial displacements from the bottom of platen 11. Such disposition insures that regardless of the lateral movement of platen 11 with respect to the center line of cradle rotation, each of rollers describes an arc of different radius with respect to the axis of cradle rotation. This means that roller 61a, for example will not be contacted by beam 64a except at one point, i.e. ideally at zero rotation; roller 60a will contact beam 64a only at one point, also ideally at zero rotation, at which position the entire weight of platen 11 and any car carried on its rails is carried on beams 64 and 64a at each end of platen 11. The position of the platen after rotation toward dumping position is shown in dotted lines.

Beams 64 and 64a are desirably a pair of cam surfaces so contoured as to coact with rollers or cam followers to elevate the platen 11 and support it independently of cradle 10, e.g. surfaces 65a and 66a of beam 64a coact with rollers 60a and 61a. In such condition it is now possible by any suitable weight sensing means to measure the weight of the platen 11 and any car thereon at zero rotation, which sensing means are not subject to rotation with the entire apparatus and thus subject to the inaccuracies introduced thereby.

In the embodiment illustrated, beam 64a and its correlative beam 64, are supported on pedestals 67 and 68 (not shown) and 67a and 68a respectively. Each pair of pedestals are in turn supported on arms of a clevis, e.g. pedestals 67 and 68 are supported on arms 70 and 71 of clevis 69 and arms 70a and 71a (not shown), respectively. Arms 72 and 72a extending oppositely to arms 70 and 71 and arms 70a and 71a (not shown), respectively, are attached to suitable load cells 73 and 73a, respectively, which are operating in tension, and which in turn are attached to the foundations 80 and 80a, respectively.

Side arms 70 and 71 and 70a and 71a (not shown), respectively, support knife edges 81 and 82 and 81a and 82a, respectively. Knife edges 82 and 82a are upwardly directed and are in turn secured to foundation 83 and 83a, respectively. Knife edges 82 and 82a provide a fulcrum about which clevis 69 and 69a, respectively, rotate sufficiently to activate weight sensing means 73 and 73a, respectively. The load centered on beams 64 and 64a is distributed by means of knife edges 81 and 81a, respectively to the arms 70 and 71 and 70a and 71a (not shown), respectively, in a downward direction. Thus, when load is applied to beams 64 and 64a as a result of their supporting platen 11, clevis 69 tends to rotate counterclockwise and clevis 69a tends to rotate clockwise about fulcrums 82 and 82a, respectively, thereby increasing the tension on load cells 73 and 73a, respectively. The summation of the effects on the load cells and 73a results in a net impulse which can be converted by conventional means into intelligence useful to an operator in determining net weight. Instead of load cells operating in tension through a system of movable linkages as above described, load cells operating in compression between the cammed surface beams 64 and 64a and the foundation supports 83 and 83a may also be used.

In order to limit motion of the beams 64 and 64a check rods, such as check rod 90 (FIG. 6) operating at each end in tension may be used. Thrust rollers 91 and 92 may be supplied for coaction with the foundations 80 and 80a to stabilize the platen 11 against longitudinal movement in either direction. Check rods 93a, 94 and 94a, and thrust rollers 95a also aid in stabilizing beam 64a. Beam 64 is similarly stabilized. All stabilizing means are unidirectional in operation to secure the necessary stabilization in a horizontal plane without introducing vertical components of force to an extent any greater than absolutely necessary. Such forces are measureable in, at most, a few pounds, and where weights of several orders of magnitude greater are involved as in coal cars, these errors, which tend to be cancelled in the weighing by difference method employed, are negligible.

In operation, then, a loaded railroad car is moved into the rotary car dumper. With the clamps free and the platen 11 supported solely by beams 64 and 64a, the effect on load cells 73 and 73a is noted. Then, the rotatation of the cradle 10 is initiated which causes the platen to shift its weight from the beams 64 and 64a to the rollers 41 and 42 running on ways, such as way 40. Clamps 31 and 32 are actuated securing the railroad car to tracks 53 and 54, and compressing the entire assembly against ways 40. After positive rotation to about 135° where dumping is complete, the motor 16 is reversed and negative rotation follows whereupon the platen 11 is again seated on beams 64 and 64a which elevate the platen 11 and any car carried thereby. Simultaneously, clamps 31 and 32 through action of clamp lifting arms 33 and 34, respectively, are released, and platen 11 is supported entirely independently of cradle 10. Stop 44 on end ring 12 prevents rotation of the cradle 10 in a counterclockwise direction more than a few minutes of rotation beyond zero rotation. Stop 44 does not, therefore, interfere with the weight sensing by introducing vertical components of force. The position of the car in clamped position is shown in dotted lines in FIG. 5, and the dumping position is shown in dotted lines in FIG. 3.

Figure 9:
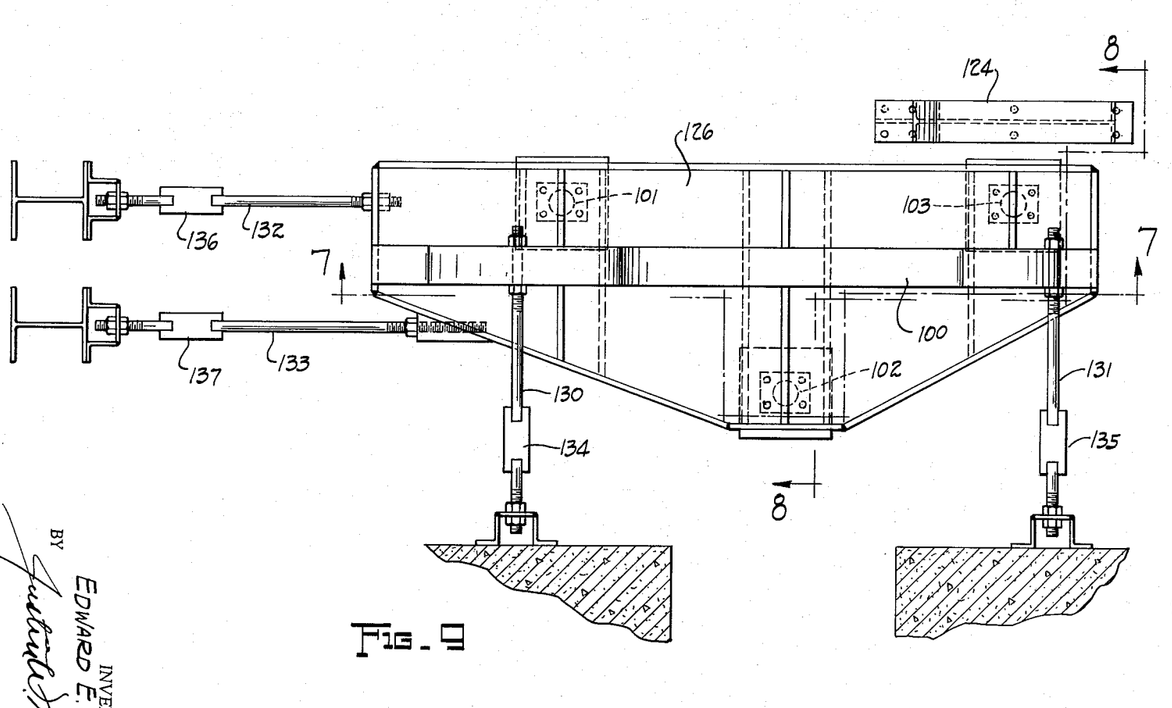
FIG. 9 is a top elevation of the load sensing means shown in FIGS. 7 and 8 showing the location of tie rods for stabilizing the apparatus without introducing substantial vertical components of force.

Although knife edges may be used as above indicated, the load sensing apparatus of the present invention may be constructed so that the load cells are operated in compression rather than in tension. One means of constructing this arrangement is illustrated in FIGS. 7–9.

Figure 7:
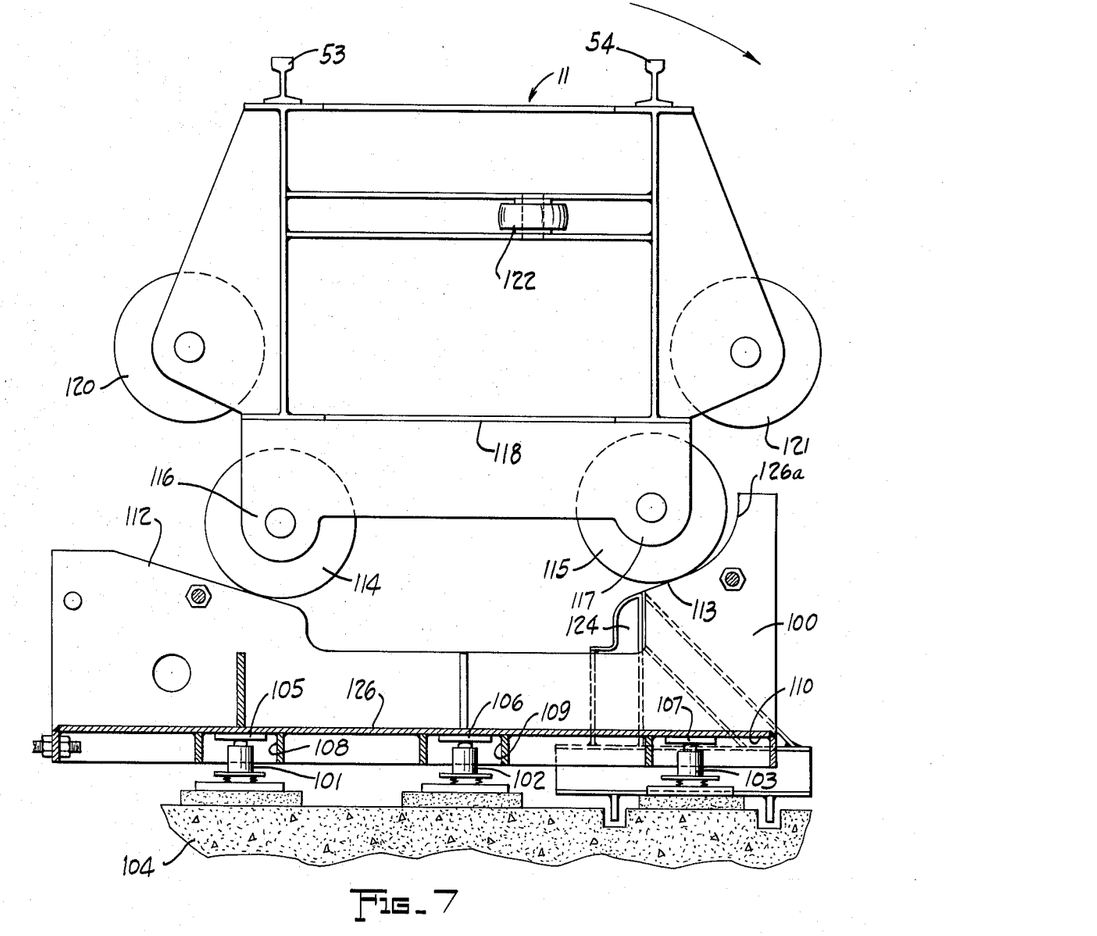
FIG. 7 is a cross-sectional view taken in the plane indicated by the line 7—7 of FIG. 9, showing a modification of the load sensing means.

There is here shown in FIG. 7 an end view of the bridge or platen 11 and the beam-roller assembly which enables the sensing of the weight as above described. Accordingly, there is provided a beam 100 supported on a plurality of load cells such as, load cells 101, 102 and 103 adapted to operate in compression. Cells 101, 102 and 103 are mounted on foundation 104 in a suitable manner with supporting beds or plates 105, 106 and 107 engaging suitable recesses 108, 109 and 110 in the base or flange 126 of beam 100. As in the previous case of beams 64 and 64a, beam 100 is provided with cammed surfaces 112 and 113 which are adapted to coact with rollers 114 and 115 which are journalled for rotation in suitable brackets 116 and 117, respectfully, secured to the lower extremity of the platen 11. Support rollers 114 are the first to leave the supporting beam 100 on positive rotation of the car dumper cradle in the direction indicated by the arrow in FIG. 7, and rear rollers 115, the first to contact beam 100 on the cammed surface 113 on negative rotation, although only minutes of angular rotation separate contacting or departure of the rollers, respectively, on or from the beam 100. As shown in FIG. 7 rollers 114 and 115 like the rollers 60a and 61a as shown in FIG. 4, are desirably set at different axial displacements from the bottom 118 of platen 11. Such disposition insures that regardless of the lateral movement of platen 11 with respect to the center line of cradle rotation, each of the rollers 114 and 115 describes an arc of different radius with respect to the axis of cradle rotation. This means that roller 115, for example will not be contacted by beam 100 except only over a relatively short distance, i.e. an inch or two, on cammed surface 113, ideally at zero rotation. Likewise, roller 114 will contact beam 100 only over a relatively short distance on cammed surface 112, ideally at zero rotation at which position, the entire weight of platen 11 and any car carried on its rails is supported on the beam 100, and its corresponding mate which is disposed at the opposite end of the bridge 11.

Platen wheels 120 and 121, as shown in FIG. 7, are disposed on the platen 11 so as to be within the cradle, such as cradle 10 shown in FIG. 1 and are so disposed for the purpose of permitting lateral movement of the platen 11 in cradle 10, as above described. Thrust roller 122 coacts with thrust plate 123 which is suitably secured in the foundation 104 (FIG. 8).

Figures 6, 8:
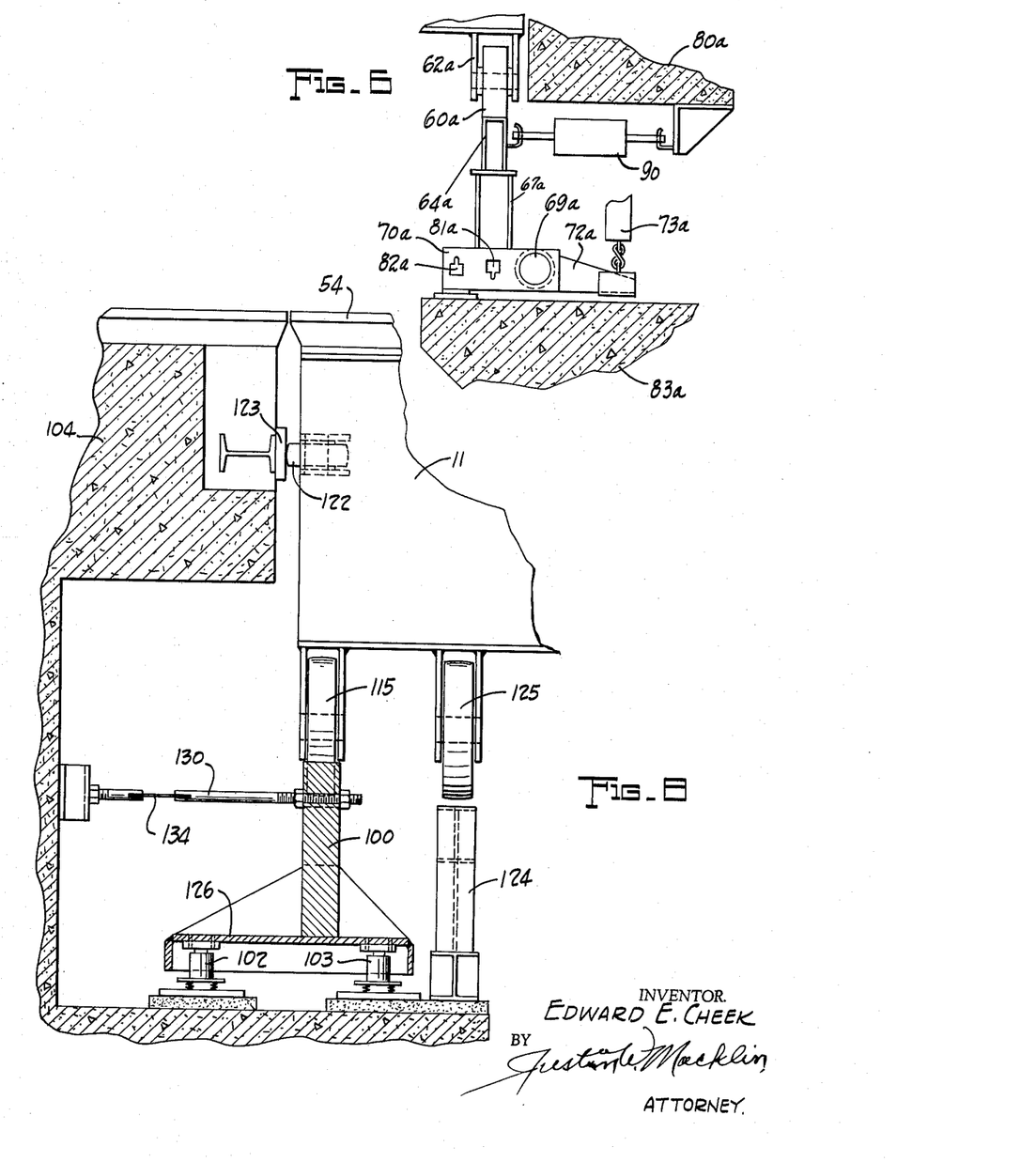
FIG. 6 is an enlargement of a portion of FIG. 1 showing in greater detail the means of transmitting the load from the bridge or platen to the load cells by means of a lever arm operating on knife edges.
FIG. 8 is a fragmentary elevation of the end of the platen, and a cross-sectional view of a modification of the load sensing means as it appears in the plane indicated by the line 8—8 of FIG. 9.

Also shown in FIG. 7 is a shock absorbing, speed arresting impact buffer member 124 mounted in the foundation 104 and displaced from the line of the beam 100 toward the center of the platen, as shown in FIG. 8. A separate roller 125 is so adapted and positioned with respect to the platen 11 as to engage buffer 124 on negative rotation toward the normal upright position, and to absorb the initial impact of the bridge as it returns to normal position to minimize wear on the cammed surfaces 112 and 113. As soon as roller 115 comes into surface engaging relationship with cammed surface 113, roller 125 is out of engagement with buffer 124.

Any suitable means for centering the platen 11 when the cradle is at zero rotation so that the rails 53 and 54 on platen 11 are properly aligned with run-on and run-off rails may be employed. One form of such centering apparatus is shown in greater detail in FIG. 7. Stop portion 126a on cammed surface 113 provides further arresting means and urging toward normal aligned position at zero rotation.

FIGS. 8 and 9 show in much better detail the location of check rods which serve to position the beam 100 and laterally extending flange 126. Thus, there are provided longitudinal tie rods 130 and 131, and lateral tie rods 132 and 133. The check rods 130, 131, 132 and 133 are provided with flexible plates 134, 135, 136 and 137, respectively, which operate in tension, but introduce no substantial vertical component of force which would adversely influence the weight reading on the load cells.

The apparatus shown in FIGS. 7, 8 and 9 functions with respect to the platen 11, in the same manner as the apparatus shown in FIG. 4. However, the means by which the load is detected according to FIGS. 7, 8 and 9 depends upon load cells used in compression rather than in cells used in tension as shown in FIGS. 1 and 4.

Figure 10:
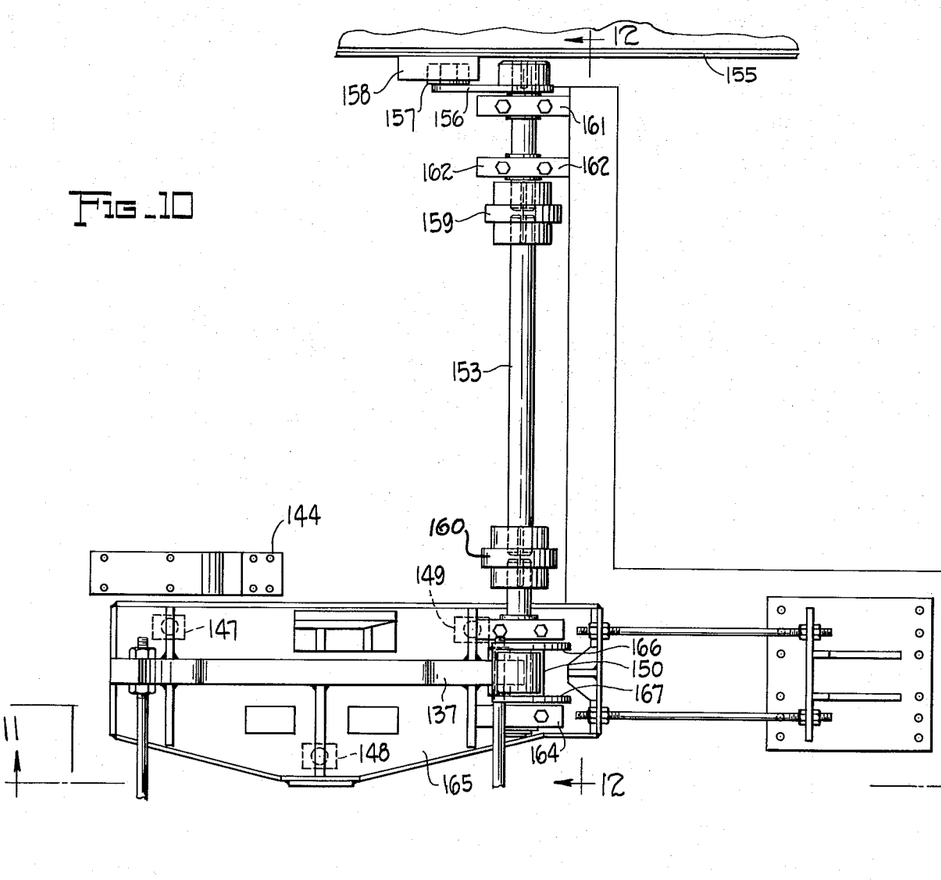
FIG. 10 is a fragmentary top elevation of the scale beam and one form of platen centering means.
Figure 11:
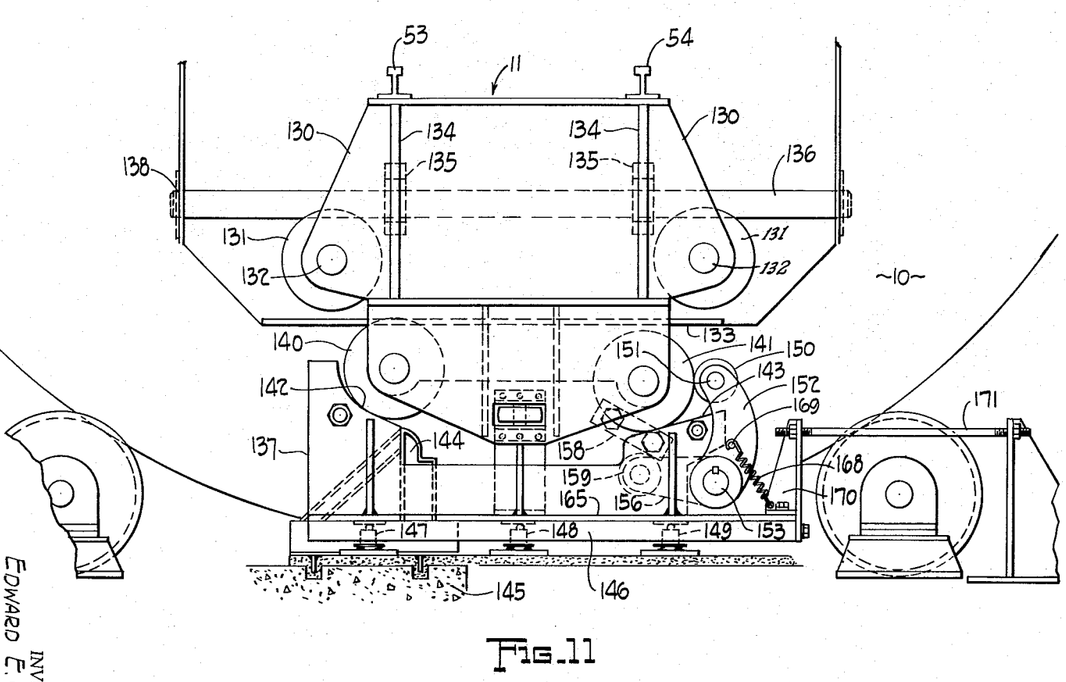
FIG. 11 is an end elevation taken in the plane indicated by the line 11—11 in FIG. 10.
Figure 12:
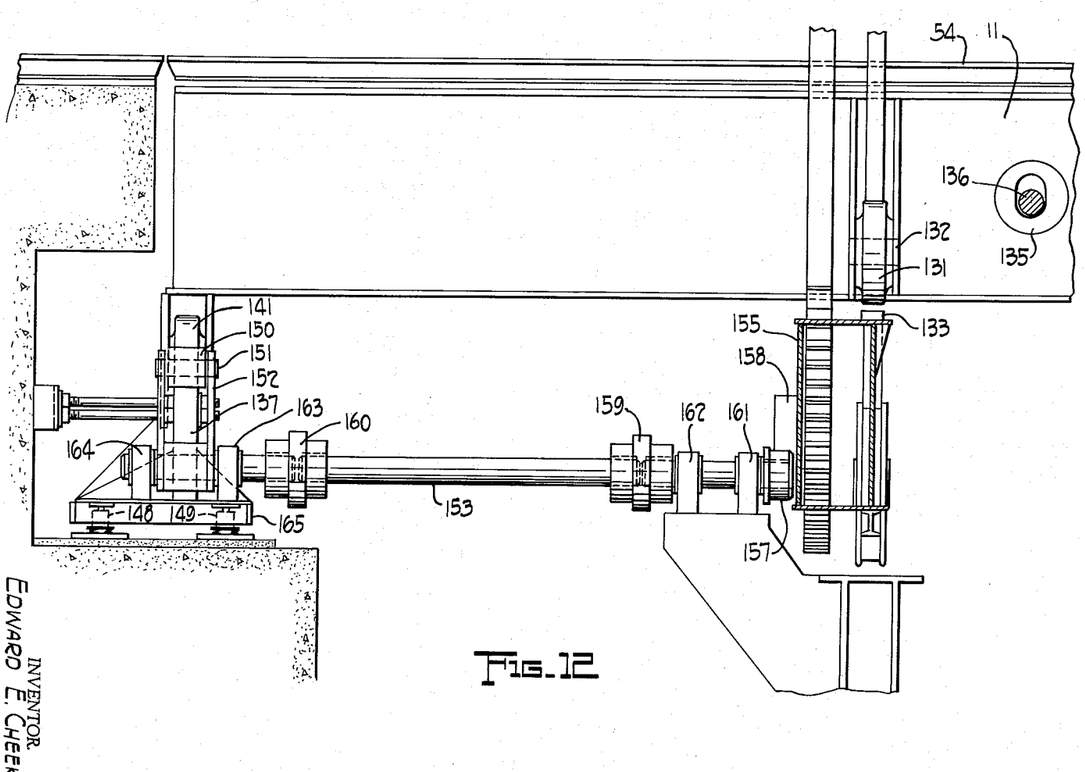
FIG. 12 is a side elevation of the platen centering mechanism taken in the plane indicated by the line 12—12 of FIG. 10.

FIGS. 10, 11 and 12 show details of a platen locking or centering mechanism whereby the platen rails are brought into fixed alignment with the run-on and run-off rails leading to and from the car dumper apparatus, respectively. The apparatus as shown in FIGS. 10, 11 and 12 rotates in a direction opposite to that shown in FIGS. 4 and 7, but the principles of operation of the weight sensing apparatus are the same. It will thus be understood that the car dumper apparatus may be fabricated to discharge the bulk material contents of railroad cars from either side of the apparatus depending upon the requirements of a particular installation.

Referring now more particularly to FIGS. 10–12, inclusive, it will be observed that the load sensing beam and load cell structure is essentially the same as that shown in FIGS. 7–9. There is also shown, particularly in FIGS. 11 and 12, another means of stabilizing the platen to longitudinal shift in the form of a "platen pin" hereinafter more particularly described.

Accordingly, there is provided a platen 11 having secured to upper surface parallel rails sections 53 and 54. As with the platens 11 shown in previous figures, there are provided laterally extending brackets 130 on each side of the platen 11 supporting platen rollers 131 for rotation about pins 132. Platen rollers 131 are adapted to coact with a platen roller track 133 which is secured to the cradle 10 and provides a means for allowing the platen 11 to shift laterally as above described. The upstanding side walls 134 of platen 11 are provided with reinforced openings 135 in axial alignment with each other, each of said openings having an elongated opening therethrough adapted to receive platen pin 136. Platen pin is anchored at its extremities to cradle 10 and extends through the platen 11. The opening in ring 135 has a width slightly greater than the diameter of the platen pin 136 and a vertical dimension slightly greater than that sufficient to permit the platen 11 to be lowered so that platen rollers 131 are brought into rolling contact with roller track 133 as the dumping operation is initiated. Dumping in the apparatus shown in FIG. 11 is effected by counterclockwise motion of cradle 10. Thus, the platen 11 after leaving load sensing beam 137 will move toward roller track 133 and at the same time shift laterally toward extremity 138 of platent pin 136. The extent of this lateral shift will depend upon the width of the railroad car and the location of an upstanding wooden beam against which the car side rests during rotation.

As indicated above, the extremities of platen 11 in providing platen shift rollers which, for convenience, may be identified as platen shift right roller 140 and platen shift left roller 141. The nature of the mounting of the shift rollers 140 and 141 is similar to the mounting of shift rollers 115 and 114, respectively, in FIG. 7. Scale beam 137 is provided with contoured surfaces 142 and 143 similarly to scale beam 64a (FIG. 4) and scale beam 100 (FIG. 7). As also shown in FIG. 7, there is provided in FIG. 11 a buffer or platen shift post 144 which is designed to take the initial impact of the platen, transferring it into concrete base 145, as the platen shift roller 140 contacts buffer 144 when the dumper is returning to seated position, or zero rotation. The base 146 of scale beam 137 is adapted to receive load cells 147, 148 and 149 in like manner with base 126 of scale beam 100.

As indicated above, a primary objective of the apparatus of FIGS. 10–12, inclusive, is to effect a positive location of the platen 11 so that platen rails 53 and 54 are in proper alignment with the run-on and run-off rails. One of the essential considerations of such a device is that it desirably adds little or no vertical component of force to the platen of the bridge 11 which would affect the load reading. The structure for achieving this purpose includes a scale lever roller 150 mounted for rotation on pin 151 carried at one extremity of arm 152. The opposite extremity of arm 152 is keyed to shaft 153 which, as best shown in FIGS. 10 and 12, extends toward cradle end ring 155.

The opposite extremity of shaft 153 is provided with crank arm 156 having secured to its distal extremity striker roller 157. Striker roller 157 is adapted to co-act with tripper block 158 which is mounted on the face of end ring 155. In order to minimize the vertical components of force introduced by this structure, flexible couplings 159 and 160 are conveniently employed, and shaft 153 is journalled for rotation in support bearings 161, 162, 163 and 164. Support bearings 163 and 164 are secured by any suitable means to flange 165 forming the base for scale beam 137. Striker roller arm 152 is conveniently formed of a pair of spaced apart plates 166 and 167 having mounted at the upper end and between the plates pin 151 on which roller 150 is journalled for rotation.

In order to urge the scale lever roller arm 152 to a reset position when the cradle 10 is rotated in a positive direction counterclockwise, there is provided spring 168 adapted to coact between pin 169 on scale lever roller arm 152 and the base 165. As shown in FIG. 11, spring 168 is anchored at its base extremity and to an upwardly extending web 170 which provides a support for check rod 171.

In operation, then, as the cradle 10 leaves the position of zero rotation or normal upright position, tripper block 158 fastened to the outside of each end ring coacts with spring 168 to permit clockwise rotation of the shaft 153 whereby crank 156 is caused to assume a more nearly upright position, and arm 152 is moved out of the path of platen shift left roller 141. Positive rotation continues to the extent of about 135° where the contents of a railroad car are dumped to a hopper below the cradle, not shown. Upon negative rotation, back to the zero rotation position, the tripper block 158 on end ring 155 strikes striker roller 157 causing counterclockwise rotation of the shaft 153 and arm 153 in following relation to platen shift left roller 141. It will be observed that in the preferred embodiment the axis of rotation of roller 150 lies in the same horizontal plane as the axis of rotation of roller 141. By such an arrangement, only a horizontal component of force is induced upon the bridge 11, and the weight reading is not adversely affected.

Cammed surfaces 143 and 142 coact with platen shift rollers 141 and 140, respectively, to lift platen 11 free from roller track 133 within the cradle 10 thereby supporting all of the weight of platen 11 and the railroad car thereon on scale beams 137 located at each end of the platen or bridge 11. Weight readings are taken both before and after dumping and the net weight discharged determined by difference.

The stabilizing mechanism of this modification shown in FIGS. 10–12 coacts with the scale beam contour 142 to fixedly place rails 53 and 54 in alignment with the run-off and run-on rails; and the platen pin 136, one of which is located adjacent each end ring as shown in FIG. 12, coacts to prevent axial displacement of the bridge which would otherwise permit undue wear at the point where the rails are severed from the run-off and run-on rails, respectively.

While the invention has been particularly described above with reference to cam means coacting with cam following shift rollers on the platen, it will be understood that other means for raising the platen free of the cradle may be used. For example, cam 100 in FIG. 8 may be replaced with hydraulic jack lift means, and the shift roller 115 replaced with jack engaging or receiving plates or pads. The hydraulic jacks, which are normally retracted during dumping and return to normal upright position, are vertically upwardly extended from hydraulic cylinders to engage the platen at suitable receiving pads mounted thereon to raise the platen out of contact with the cradle during the weight-sensing operation.

The preferred weight sensing means above described are provided in the form of a load cell. It will be understood that instead of electrical weight sensing means, mechanical means, hydraulic weight sensing means, or other pressure responsive means may be used for such purpose.

Thus, there has been provided an improved railroad car dumper weighing means which senses the weight of only a fraction of the total weight of the car dumper apparatus thus improving accuracy, and one in which the weight sensing apparatus is stationary and thus not subject to repeated cycles of inversion and righting which also introduces error into the weighing means.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A railroad car weighing apparatus in combination with a railroad track supporting platen mounted for rotation with a rotary car dumping cradle comprising:
   (a) weight sensing means, and
   (b) platen elevating means coacting with said weight sensing means for elevating and supporting the platen independently of the dumping cradle when the cradle is at zero rotation, including:
      (1) stationary cam means adjacent the extremities of the platen, and
      (2) cam following means secured to the platen extremities for coaction with said stationary cam means.

2. A railroad car weighing apparatus in accordance with claim 1 in which the weight sensing means includes a plurality of load cells.

3. A railroad car weighing apparatus in accordance with claim 1 in which the weight sensing means includes load cell means disposed adjacent each extremity of said platen, and the platen elevating means includes an elongated beam and means coacting between said beam and said load cell means to transmit vertical components of force to said load cell means, said beam having a cammed surface, cam following means carried by said platen at each extremity thereof and adapted to coact with said cammed surface at the normal upright position of said platen to elevate and freely support the platen and disposed the entire weight thereof on said beam.

4. A railroad car weighing apparatus in accordance with claim 3 in which the cam following means includes a pair of rollers, the axles of rotation of which are parallel to the axis of rotation of said cradle, said rollers being disposed at the ends of the longitudinal edges of said platen.

5. A railroad car weighing apparatus in accordance with claim 4 in which the axis of rotation of said rollers are disposed at different radial distances from the axis of rotation of said cradle.

6. A railroad car weighing apparatus in accordance with claim 4 in which the cammed surface is a compound cammed surface, portions of which are adapted, respectively, to coact with each of said rollers individually to elevate said platen at the normal upright position.

7. A railroad car weighing apparatus in accordance with claim 4 in which the cammed surface includes a portion adapted to coact with one of the rollers of said pair to limit negative rotation of the platen passed the normal upright position.

8. A railroad car weighing apparatus in accordance with claim 7 which is additionally characterized by means coacting with the other of said pair of platen rollers for centering the platen at zero rotation.

9. A rotary railroad car dumping apparatus having:
 (a) a rotatable car dumper cradle including end plates at each end of said cradle,
 (b) a railroad car track supporting platen freely extending through said cradle and rotatable therewith, the track on said platen adapted to be aligned with run-on and run-off tracks leading to and from said car dumping apparatus, respectively,
 (c) weighing means for supporting the platen independently of the car dumper at normal upright position including,
 (d) weight sensing means,
 (e) stationary cam means adjacent each extremity of said platen,
 (f) roller means supported at each extremity of said platen and adapted to coact with said cam means to elevate said platen independently of said cradle and to activate said sensing means,
 (g) means coacting with said cam means and said platen roller means to prevent negative rotation of said platen past the normal upright position where said platen tracks are in substantial alignment with said run-on and run-off tracks,
 (h) releasable locking means coacting with said platen roller means to prevent positive rotation of said platen at the normal upright position, and
 (i) means coacting with the end ring of said cradle and said releasable locking means for effecting release thereof on positive rotation of the cradle, and locking of said releaseable locking means upon negative rotation, whereby the rails carried by said platen are fixedly aligned with the run-on and run-off rails leading to and from said car dumping apparatus.

10. A rotary railroad car dumping apparatus comprising:
 (a) a rotatable car dumper cradle having sides and end plates;
 (b) a platen having a railroad trackway mounted thereon, said platen freely extending through, supported by and rotatable with, said cradle, said platen having its ends extending beyond the ends of said cradle, wheels mounted on said platen within the cradle to permit limited lateral movement thereon, said movement being towards and away from the side of the cradle over which material, in a car on the trackway, is dumped, whereby the side of the car adjacent said dumping side of the cradle is moved thereagainst as the cradle is rotated, the trackway on said platen when at zero rotation, being aligned with run-on and run-off trackways leading to and from said car dumping apparatus;
 (c) weighing means for supporting the platen independently of said cradle at a normal upright position and point of zero rotation, said means including:
  (i) weight sensing means;
  (ii) cam means adjacent each ends of said platen for coaction with said weight sensing means, each cam means including a pair of stationary oppositely disposed converging cammed surfaces;
  (iii) cam following means for coaction with said cam means, said cam follower means including a pair of wheels secured to each end of the platen adjacent the cam means for coaction therewith, each wheel of said pairs coacting with a corresponding adjacent cammed surface at the point of zero rotation, to raise the platen from the cradle whereby the weight of the platen is transferred from the cradle to the cam means.
 (d) means on said cam means, for coaction with said cam follower means to prevent negative rotation of said platen past the normal upright position where the trackway on said platen is aligned with the run-on and run-off trackways; and
 (e) releasable locking means coacting with said cam follower means to lock said cam follower means on said cam means to prevent positive rotation of said platen at the normal upright position.

11. The apparatus of claim 10, which includes additionally:
 (f) means coacting between the end plates of said cradle and said releasable locking means for effecting release thereof on positive rotation of the cradle, and locking of said releasable locking means upon negative rotation thereof, whereby the trackway mounted on said platen is fixedly aligned with the run-on and run-off trackways leading to and from said car dumping apparatus.

12. A rotary railroad car dumper apparatus comprising:
 (a) a rotatable car dumper cradle;
 (b) a railroad car track supporting platen freely extending through said cradle and rotatable therewith;
 (c) weighing means for supporting the platen independently of the car dumper at normal operating position, said weighing means including;
  (i) weight sensing means;
  (ii) stationary cam means adjacent the extremities of the platen;
  (iii) cam following means secured to the platen extremities for coaction with said adjacent stationary cam means as the cradle rotates theretowards, to elevate said platen independently of said cradle and to activate said sensing means.

References Cited by the Examiner

UNITED STATES PATENTS 2,021,503  11/35  Fildes _____________ 214—38.40 X

FOREIGN PATENTS 802,172  10/58  Great Britain.

HUGO O. SCHULZ, *Primary Examiner.*

GERALD M. FORLENZA, *Examiner.*